United States Patent
Acharya et al.

(10) Patent No.: US 10,122,645 B2
(45) Date of Patent: Nov. 6, 2018

(54) OUTPUT QUEUE LATENCY BEHAVIOR FOR INPUT QUEUE BASED DEVICE

(71) Applicant: Cisco Technology, Inc., San Jose, CA (US)

(72) Inventors: Dipankar Bhatt Acharya, Saratoga, CA (US); Guglielmo Morandin, San Jose, CA (US); Rong Pan, Saratoga, CA (US); Chiara Piglione, San Jose, CA (US); Hiroshi Suzuki, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 60 days.

(21) Appl. No.: 13/708,640

(22) Filed: Dec. 7, 2012

(65) Prior Publication Data
US 2014/0161135 A1    Jun. 12, 2014

(51) Int. Cl.
*H04L 12/863* (2013.01)
*H04L 12/825* (2013.01)
*H04L 12/935* (2013.01)

(52) U.S. Cl.
CPC ........ *H04L 47/6255* (2013.01); *H04L 47/263* (2013.01); *H04L 49/3018* (2013.01); *H04L 49/3045* (2013.01)

(58) Field of Classification Search
CPC ....... H04L 47/10; H04L 47/26; H04L 47/263; H04L 47/266; H04L 47/30; H04L 47/32;
(Continued)

(56) References Cited

U.S. PATENT DOCUMENTS 5,042,029 A    8/1991   Hayakawa
5,163,046 A    11/1992  Hahne et al.
(Continued)

FOREIGN PATENT DOCUMENTS

CN    101001210 A    7/2007
CN    102739516 A    10/2012
(Continued)

OTHER PUBLICATIONS

International Search Report and Written Opinion from PCT/US2013/070235, dated May 23, 2014, WO.
(Continued)

*Primary Examiner* — Ian N Moore
*Assistant Examiner* — Justin T Van Roie (57) ABSTRACT

In one implementation, an input queue switch provides latency fairness across multiple input ports and multiple output ports. In one embodiment, each input port maintains a virtual output queue for each associate output port. The virtual output queues across multiple inputs are aggregated for each specific output port. The sum of the lengths of the virtual output queues is compared to a threshold, and based on the comparison, feedback may be generated to control the operation of the input port for subsequent packets. The feedback may instruct the input port to stop buffering or drop packets destined for the output port with the sum of the lengths of the virtual output queues associated to the specific output port that exceeds the threshold. In another embodiment, each packet has an arrival timestamp, and a virtual output queue having the oldest timestamp is selected first to dequeue.

20 Claims, 6 Drawing Sheets

(58) Field of Classification Search
CPC . H04L 47/6255; H04L 49/3045; H04L 49/90; H04L 49/9047; H04L 49/9052; H04L 49/9084; H04L 49/3018
See application file for complete search history.

(56) References Cited

U.S. PATENT DOCUMENTS

| | | | |
|---|---|---|---|
| 5,592,627 | A | 1/1997 | Burt et al. |
| 6,105,064 | A | 8/2000 | Davis et al. |
| 6,151,300 | A | 11/2000 | Hunt et al. |
| 6,249,530 | B1 | 6/2001 | Blanco et al. |
| 6,256,675 | B1 | 7/2001 | Rabinovich |
| 6,415,410 | B1 | 7/2002 | Kanerva et al. |
| 6,430,153 | B1 | 8/2002 | Hughes et al. |
| 6,493,316 | B1 | 12/2002 | Chapman et al. |
| 6,603,772 | B1 | 8/2003 | Moussavi et al. |
| 6,654,363 | B1 | 11/2003 | Li et al. |
| 6,717,945 | B1 | 4/2004 | Jue et al. |
| 6,721,273 | B1 | 4/2004 | Lyon |
| 6,751,219 | B1 | 6/2004 | Lipp et al. |
| 6,757,255 | B1 | 6/2004 | Aoki et al. |
| 6,775,280 | B1 | 8/2004 | Ma et al. |
| 6,999,453 | B1 | 2/2006 | Chemla et al. |
| 7,010,611 | B1 | 3/2006 | Wiryaman et al. |
| 7,085,846 | B2 | 8/2006 | Jenne et al. |
| 7,245,626 | B1 | 7/2007 | Sindhu et al. |
| 7,519,054 | B2 | 4/2009 | Varma |
| 7,583,594 | B2 | 9/2009 | Zakrzewski |
| 7,643,418 | B1 | 1/2010 | Varier et al. |
| 7,656,800 | B2 | 2/2010 | Morandin |
| 7,675,857 | B1 | 3/2010 | Chesson |
| 7,760,633 | B2 | 7/2010 | Morandin |
| 7,778,164 | B2 | 8/2010 | Shimonishi |
| 7,787,379 | B2 | 8/2010 | Mekkattuparamban et al. |
| 7,859,999 | B1 | 12/2010 | Basu et al. |
| 7,869,395 | B2 | 1/2011 | Wise et al. |
| 8,150,995 | B2 | 4/2012 | Weston et al. |
| 8,189,476 | B1 | 5/2012 | Rothstein et al. |
| 8,233,438 | B2 | 7/2012 | Wise et al. |
| 8,340,099 | B2 | 12/2012 | Black et al. |
| 8,457,053 | B2 | 6/2013 | Wise et al. |
| 8,719,398 | B2 | 5/2014 | Qian et al. |
| 8,767,752 | B1 | 7/2014 | Tripathi et al. |
| 8,787,378 | B2 | 7/2014 | Lee et al. |
| 8,797,871 | B2 | 8/2014 | Morandin |
| 8,797,877 | B1* | 8/2014 | Perla ............... H04L 49/00 370/230 |
| 8,873,385 | B2 | 10/2014 | Wu et al. |
| 9,344,533 | B2 | 5/2016 | Weston et al. |
| 2001/0015956 | A1 | 8/2001 | Ono |
| 2001/0050916 | A1* | 12/2001 | Krishna et al. ............ 370/419 |
| 2002/0064156 | A1* | 5/2002 | Minkenberg ........ H04L 49/25 370/392 |
| 2002/0085578 | A1 | 7/2002 | Dell et al. |
| 2002/0118689 | A1 | 8/2002 | Luijten et al. |
| 2002/0122421 | A1* | 9/2002 | Ambiehl et al. ........... 370/391 |
| 2003/0021282 | A1 | 1/2003 | Hospodor |
| 2003/0031193 | A1 | 2/2003 | Andrews et al. |
| 2003/0058802 | A1 | 3/2003 | Jones et al. |
| 2003/0058880 | A1 | 3/2003 | Sarkinen et al. |
| 2003/0063609 | A1 | 4/2003 | Bergenfeld |
| 2003/0179759 | A1 | 9/2003 | Wang |
| 2004/0022248 | A1 | 2/2004 | Yuang et al. |
| 2004/0042397 | A1* | 3/2004 | Chang et al. ............... 370/230 |
| 2004/0109412 | A1 | 6/2004 | Hansson et al. |
| 2004/0109477 | A1 | 6/2004 | Lee et al. |
| 2005/0063301 | A1 | 3/2005 | Glaise et al. |
| 2005/0063303 | A1 | 3/2005 | Samuels et al. |
| 2006/0045058 | A1 | 3/2006 | Sun et al. |
| 2007/0076621 | A1 | 4/2007 | Malhotra et al. |
| 2007/0195761 | A1 | 8/2007 | Tatar et al. |
| 2007/0237074 | A1 | 10/2007 | Curry |
| 2007/0248009 | A1 | 10/2007 | Petersen |
| 2008/0115128 | A1 | 5/2008 | Achanta et al. |
| 2010/0091782 | A1 | 4/2010 | Hiscock |
| 2010/0220742 | A1 | 9/2010 | Brewer et al. |
| 2010/0246603 | A1 | 9/2010 | Rabie et al. |
| 2010/0316012 | A1* | 12/2010 | Stanwood et al. ............ 370/329 |
| 2011/0051604 | A1 | 3/2011 | Nishimura |
| 2012/0327779 | A1 | 12/2012 | Gell et al. |
| 2013/0114408 | A1 | 5/2013 | Sastry et al. |
| 2013/0114593 | A1 | 5/2013 | Jabr et al. |
| 2014/0185612 | A1 | 7/2014 | Ilyadis et al. |

FOREIGN PATENT DOCUMENTS

| | | |
|---|---|---|
| EP | 0661851 B1 | 7/1995 |
| EP | 1133110 A2 | 9/2001 |
| WO | WO2004023718 A2 | 3/2004 |
| WO | WO2012004689 A1 | 1/2012 |

OTHER PUBLICATIONS

A.S. Tanenbaum, et al., "Computer Networks", Dec. 31, 2011, pp. 246-264, Section 3.4 & 3.4.2, Boston, MA.

International Search Report and Written Opinion, from PCT/US2013/072760, dated May 22, 2014, WO.

International Search Report and Written Opinion, from related PCT Application No. PCT/US2013/069562, dated Feb. 10, 2014, WO.

Partial International Search Report, from PCT/US2013/072760, dated Mar. 18, 2014, WO.

Partial Search Report, from PCT/US2014/016176, dated Jun. 13, 2014, WO.

Partial Search Report cited in PCT/US2013/070235, dated Jan. 29, 2014.

Deng Pan et al., FIFO-Based Multicast Scheduling Algorithm for Virtual Output Queued Packet Switches, Oct. 2005, vol. 54, IEEE Transactions on Computers.

Devavrat Shah et al., Optimal Scheduling Algorithms for Iput-Queued Switches, 2006, IEEE.

Nick McKeown et al., The Tiny Tera: A Packet Switch Core, 1997, IEEE Micro.

Rajeev Sivaram et al., HIPIQS: A High-Performance Switch Architecture using Input Queuing, Apr. 1998, IEEE Transactions on Parallel and Distributed Systems.

International Search Report and Written Opinion, from PCT/US2014/016176, dated Sep. 15, 2014, WO.

International Preliminary Report on Patentability, from PCT/US2013/070235, dated Jun. 18, 2015, WO.

Chinese Office Action for related Chinese Application No. 2013 800 636 83.9 dated Feb. 15, 2017, with English Translation.

English translation of Third Office Action in corresponding Chinese Application No. 201380063683.9, dated Mar. 12, 2018, 4 pgs.

* cited by examiner

OUTPUT QUEUE LATENCY BEHAVIOR FOR INPUT QUEUE BASED DEVICE

This disclosure relates in general to the field of internet protocol (IP) communication, and more particularly, to input queue based switches.

BACKGROUND

IP communication involves the transmission of messages in the form of one or more data packets. The data packets include a source address and at least one destination address. A switch is a network device that directs traffic towards the destination address. Switches include multiple inputs and multiple outputs. A crossbar switch includes a selectable connection from each of the multiple inputs to each of the multiple outputs. A crossbar switch permits only one data packet to be transmitted to any one output at any particular time.

One of the problems associated with switches is buffer bloat. Buffer bloat occurs in the form of increased latency and jitter when large buffers in the network are swamped by interactive applications such as voice over IP, real time video streaming, financial transactions, and other bandwidth hungry applications. Because of the downward trend in the price of memory, switch and router manufacturers have increased memory sizes used for the buffers. The increase in buffer size reduces the risk of dropped packets, but increased buffer sizes contribute to the buffer bloat. Large full or almost full buffers result in large delays experienced by the transmitted packets. This may cause timeouts or may otherwise result in a bad end-user experience.

BRIEF DESCRIPTION OF THE DRAWINGS

Exemplary embodiments are described herein with reference to the following drawings.

DESCRIPTION OF EXAMPLE EMBODIMENTS

Overview

In one embodiment, a method includes receiving a virtual output queue length value from each of a plurality of input ports coupled to an output port, calculating an aggregate queue length value for the output port as a sum of the virtual output queue length values from the plurality of input ports, and generating a feedback message for at least one of the plurality of input ports including the aggregate queue length value.

In another embodiment, a network device includes at least a communication interface and a controller. The communication interface is coupled to an output port and configured to receive a virtual output queue length value from each of a plurality of input ports coupled to the output port. The controller is configured to calculate an aggregate queue length value for the output port as a sum of the virtual output queue length value from each of the plurality of input ports and compare the aggregate queue length value to a predetermined threshold. The controller is configured to generate feedback is provided to the plurality of input ports according to a result of the comparison.

In another embodiment, a non-transitory computer readable medium containing instructions that when executed are configured to calculate an aggregate queue length value for a output port as a sum of a plurality of virtual output queue length values associated with one of a plurality of input ports, calculate a difference between the aggregate queue length value and a predetermined queue length value, and generate a message based on the difference between the aggregate queue length value and the predetermined queue length value.

Example Embodiments

A variety of switching architectures have been developed and employed in networking. Two examples include input queue switches and output queue switches. As the names imply, input queue switches involve packet queues at input ports, and output queue switches queue packets at each output port.

In one example of an output queue switch, packets destined to a particular output port are queued into a first-in-first-out (FIFO) buffer at the output port when the output port is busy. When the output port becomes available, the packet at the head of the FIFO buffer is selected and sent out from the output port to a link. The queuing latency experienced by an incoming packet is the time required for the link to drain all of the packets that are ahead of the incoming packet. Using Little's Law, the maximum queuing latency for any packet is the size of the buffer divided by the drain rate of the link.

In input queue switches, on the other hand, in which queues are associated with each of the input ports, the packets in a queue may be destined for different output ports. In input queue switches with a single FIFO queue for each input port, all packets are stored in the single FIFO queue regardless of destination or associated output port. There are two types of buffer latency or latency related problems associated with this architecture.

First, there is no maximum bound on the latency. Each input port makes an independent decision regarding the buffering limit. The scheduler, which is responsible for controlling the transmission of packets from input ports to outputs ports, makes the decision about the bandwidth allocated to each input port to drain the buffered packets. There is no mechanism to communicate how often or when an input port is served by the scheduler. Therefore, for any particular packet, there is no maximum bound on the latency that the packet could experience.

Secondly, because only the packet at the head of the FIFO queue can be transmitted, if the output port for this packet is busy, all packets behind the packet are delayed. Such delay may be referred to as head of the line (HOL) blocking delays. Accordingly, the amount of latency may vary drastically from one input port to another.

As further illustration, consider two communication paths through a switch. Data flows on one of the communication paths between two servers through the switch and the queues are partially filled. If the queues are large because of the availability of memory, packets on the second communication path may be delayed a significant amount of time. In some situations, the second communication path would be improved if the packets were dropped rather than queued so the packets can be retransmitted in another route. Input queue switch designs choose the increased delay over dropped packets. However, in output queue switches, a packet, regardless of which input port the packet comes from, experiences a delay that depends only on the amount of packets that are in the output queue ahead of the packet. Packets in other output queues are not affected. The following embodiments emulate or mimic the buffer latency performance of an output queue switch in an input queue switch.

Figure 1:
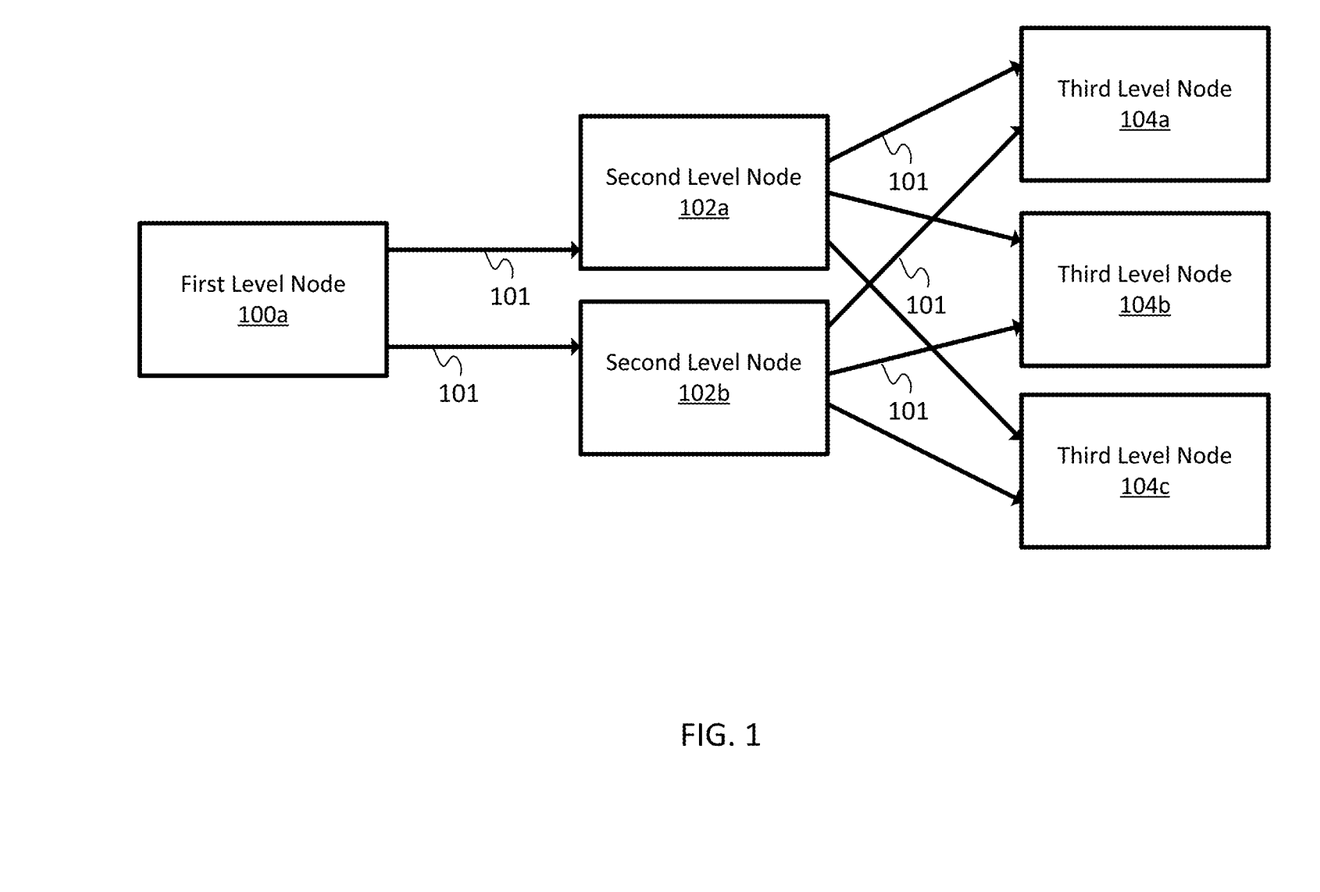
FIG. 1 illustrates an example network of input queue switches.

FIG. 1 illustrates an example network of input queue devices. Any number of input queue switches, including a single switch, may include the following embodiments. The network may be a fabric including multiple stages connected by one or more crossbar switches. The term fabric relates to the grid-like pattern of the crossbar switch that connects multiple inputs to multiple outputs in a matrix arrangement. The crossbar switch may be referred to as a cross point switch or a matrix switch. The crossbar switch may connect M inputs and N outputs, which includes M×N cross points so that each input is selectably connected to each output. The cross points selectably connect the input lines to the output lines. In one example, the crossbar switch may have 10 inputs, 1000 outputs, and 10,000 cross points. The crossbar switch may include a network of transistors. When the transistor of a cross point is enabled, the input is connected to the output through the cross point.

Multiple cross points may be activated at a time in order to transfer a packet to multiple outputs simultaneously. However, multiple inputs cannot be connected to a single output. An arbiter prevents multiple inputs from being connected to a single output at the same time. The arbiter is configured to control the cross points. The arbiter may comprise logic or hardware configured to output a control signal that selectively energizes the cross points. The control signal may activate or energize a transistor at each cross point. A physical connection (e.g., wire or trace) connects the arbiter to each of the cross points. The arbiter decides the order that packets are dequeued from the input queues.

The network may be a local area network including network devices as the nodes. The network devices may be any device capable of replicating and forwarding data packets. Example network devices include routers and switches. The network may include from two nodes to thousands of nodes. The nodes are arranged in stages, an upstream stage includes a first level node 100a, an intermediate stage includes second level nodes 102a-b, and a downstream stage includes third level nodes 104a-c. More intermediate stages may be included. As shown by solid lines 101, data packets are forwarded from the upstream stages to the downstream stages. When an incoming packet is received at an input port, the node consults a forwarding table and replicates the incoming packet for each of the egress ports assigned to endpoints that should receive a copy of the incoming packet.

Figure 2:
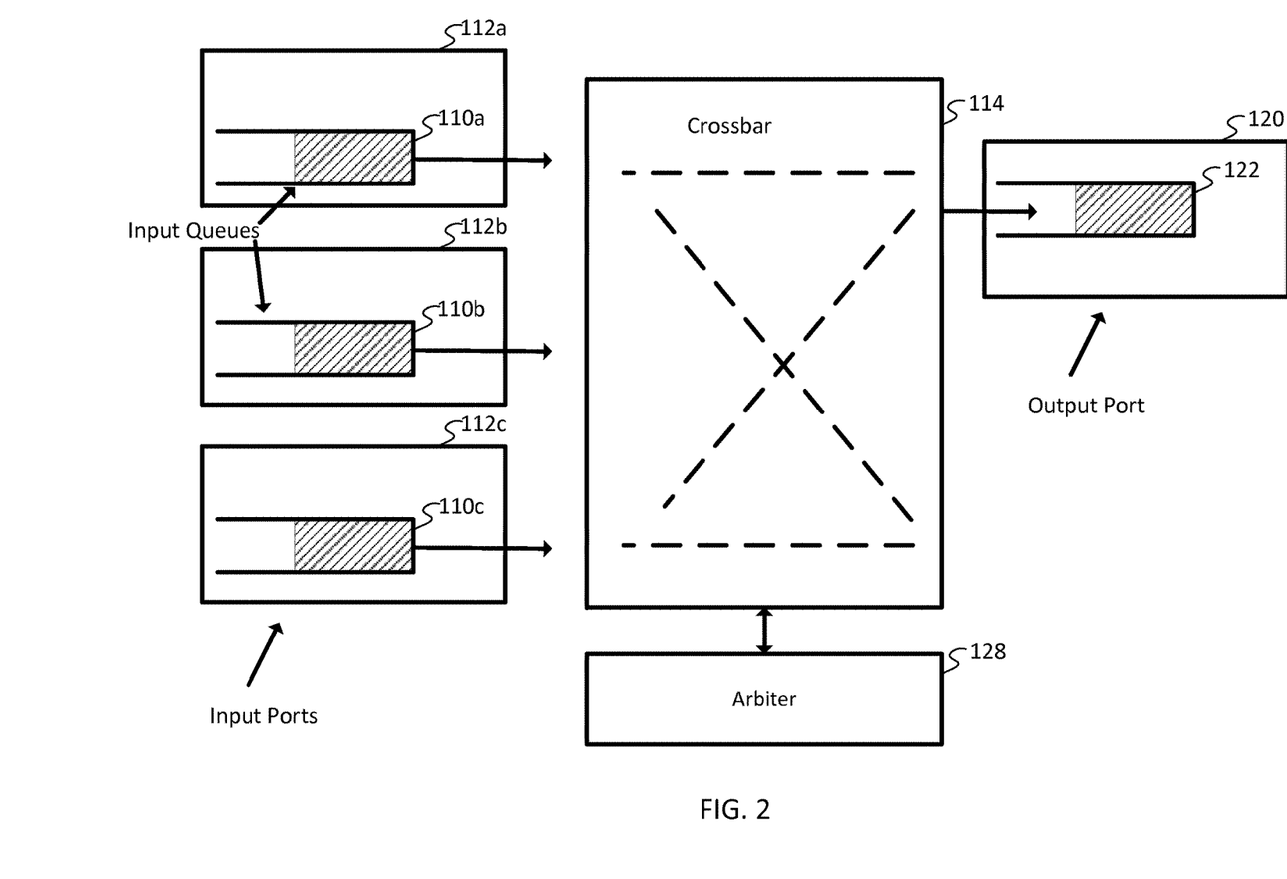
FIG. 2 illustrates an example node of the network of FIG. 1.

FIG. 2 illustrates an example node of the network of FIG. 1. The example node includes three input ports 112a-c, a crossbar 114, an arbiter 128, and at least one output port 120 with at least one real output queue 122. The example shown in FIG. 2 includes a single output port 120. More output ports may be used. Additional, fewer, or different components may be included in the node of FIG. 2.

The input ports 112a-c include an input queue for each of the output queues. The example shown in FIG. 2 includes a single output port 120, and accordingly, each of the input ports 112a-c includes one input queue 110a-c. If more output ports are included, each input port includes an input queue associated with each additional output port. The input queues 110a-c may be referred to as virtual output queues. Each of the input queues 110a-c is associated with the same output port 120. The input queues 110a-c and output queue 120 interact to mimic the behavior of an output queue switch in the input queue switch of FIG. 2.

Each of the output ports may include a small output queue associated to the port. The small output queue may not be used for packet flow control. The output queues may be much smaller than virtual output queues (e.g., by a factor of 10 or more). The output queue may be a jitter buffer.

In one aspect, the draining rates of the input queues 110a-c are controlled as a function of the occupancy of the input queues 110a-c. The arbiter 128 controls the transmission of packets through the crossbar 114. Accordingly, the arbiter 128 controls the draining rate of the input queues 110a-c. The arbiter 128 may access the current occupancy of each of the input queues 110a-c and set the draining rate for the respective input queues according to associated occupancy and a latency parameter as shown by Equation 1. The latency parameter relates to an ideal latency for each input queue in order to provide a consistent latency for packets across all of the input queues 110a-c. The latency parameter may be a defined maximum latency for the input queues 110a-c. The draining rates of the input queues vary according to current lengths of the queue so that the packet at the head of each queue is transmitted at nearly the same time. The input queues may be labeled, which is represented by i.

$$\text{Draining rate}[i] = \frac{\text{current occupancy}[i]}{\text{latency paremeter}} \quad \text{Eq. 1}$$

In another aspect, the input queues 110a-c and output queue 120 interact to limit the amount of memory used for buffering. The amount of memory used for buffering is limited so that packets are dropped rather than delayed by excessively long queues. First, the output ports collect and aggregate occupancy data from associated input queues 110a-c. For example, the output port 120 receives a virtual output queue length value from input queue 110a at input port 112a, another virtual output queue length value from input queue 110b at input port 112b, and another virtual output queue length value from input queue 110c at input port 112c. An aggregate queue length value is calculated for the output port 120 as a sum of the virtual output queue length values. The calculation of the aggregate queue length value may be made by the arbiter 128 or other logic associated with the output port 120.

The aggregate queue length value is compared to a threshold. The threshold may be stored in memory or received in a user input. The threshold may be measured in bytes or kilobytes. Examples for the threshold include 100 kilobytes, 150 kilobytes, 300 kilobytes, or 1 megabyte. The threshold may be variably set according to a measurement of delay or jitter in the data flow.

The arbiter 128 or other logic associated with the output port 120 is configured to generate a tail drop message if the aggregate queue value exceeds the predetermined threshold. The tail drop message instructs at least one of the input ports to stop buffering subsequent packets associated with the output port 120.

Figure 3:
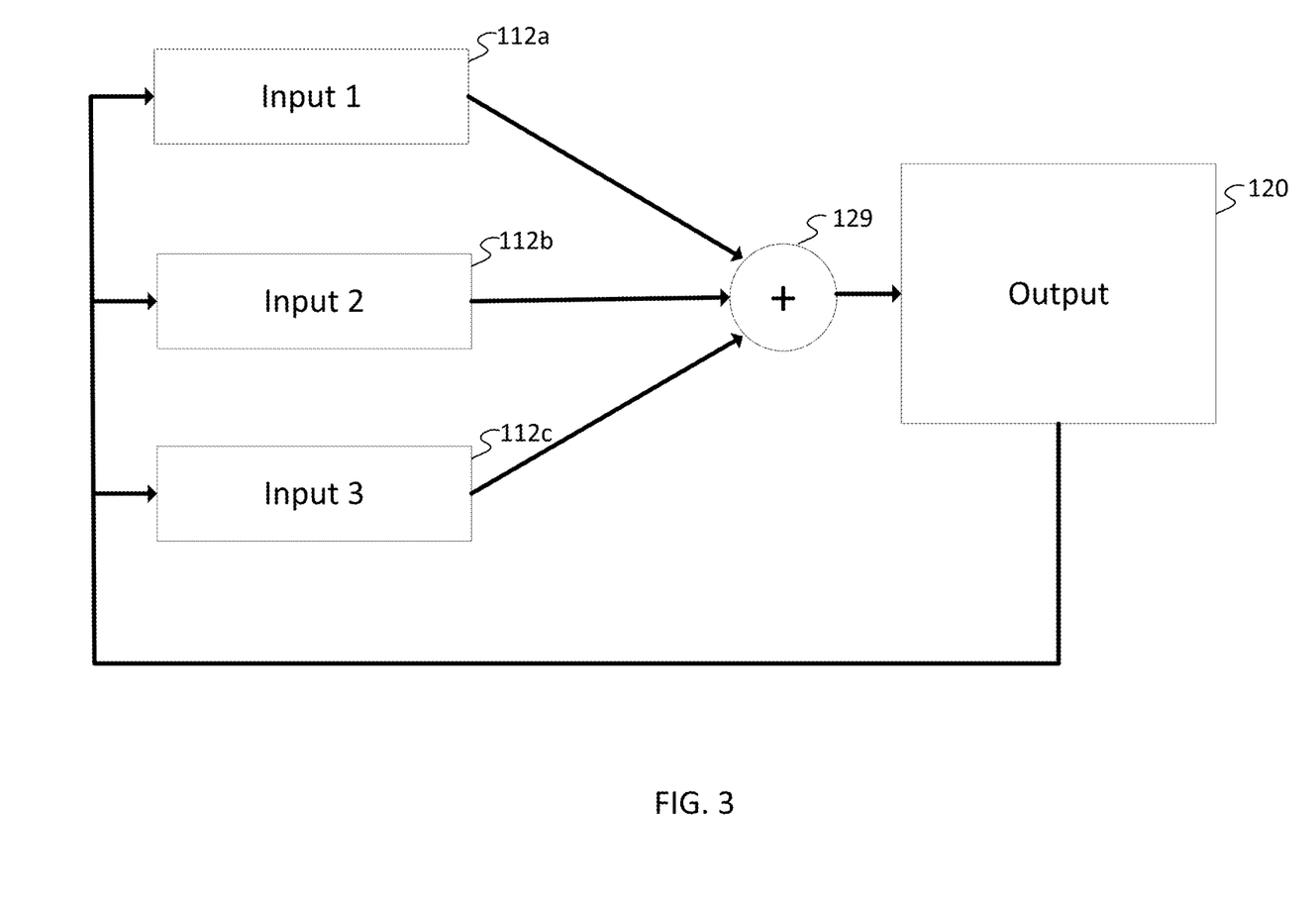
FIG. 3 illustrates a feedback loop of the example node of FIG. 2.

FIG. 3 illustrates a feedback loop of the example node of FIG. 2. FIG. 3 does not depict the data paths or communication paths of the node. Rather, FIG. 3 includes the feedback control for the limiting the size of the memory allocated for memory buffers. The feedback loop may not include actual separate data paths as shown in FIG. 3. FIG. 3 is a logical diagram of the feedback system. Each of the inputs 112a-c includes a virtual output queue that tracks a representative portion of the queue of output 120. A summer 129 sums the virtual output queue occupancies of the inputs 112a-c. The sum is compares to a threshold. When the sum exceeds the threshold, feedback is sent to the input 112a-c to stop buffering. Additional, fewer, or different components may be included in the feedback loop of FIG. 3.

The feedback may take the form of a tail drop message. The tail drop message triggers packets to be dropped by the transmission control protocol (TCP) in the transport layer of the Open Systems Interconnection (OSI) model. The tail drop message is a congestion notification for TCP, which causes TCP to lower the data transfer rate. For example, a TCP operating at 10 megabit/second may reduce to 5 megabit/second when it sees a congestion notification such as a tail drop message or the packet drop itself. Because a significant portion of the traffic on the network may be TCP traffic, this sequences eases the congestion on the network. An additional feedback for each of the inputs 112a-c may be included, but is not illustrated in FIG. 3. The additional feedback monitors the current input queue length in each input and adjusts the draining rate of the input queue as a function of the current input queue length. The function may be a proportional function.

Figure 4:
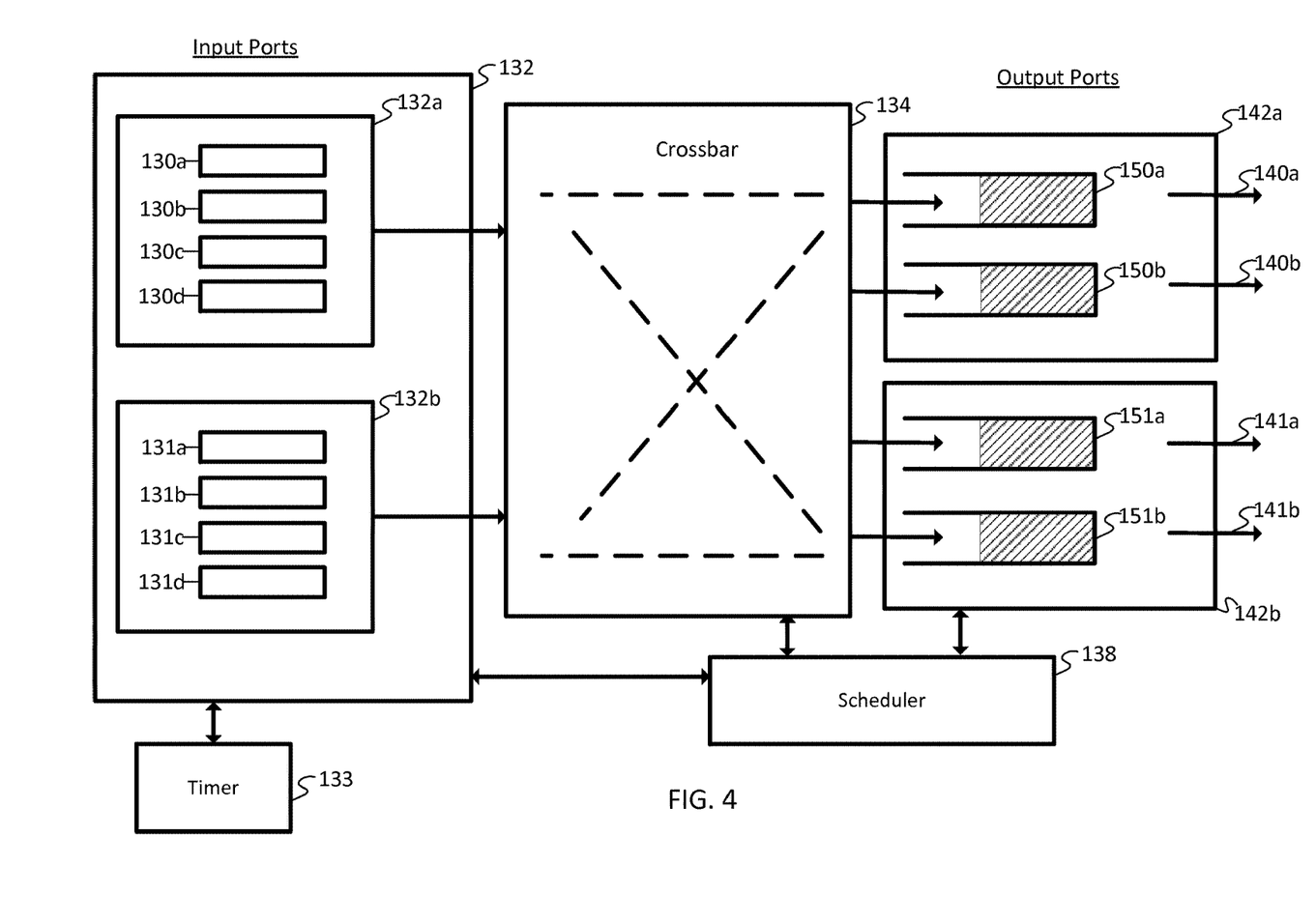
FIG. 4 illustrates another example node of the network of FIG. 1.

FIG. 4 illustrates another example node of the network of FIG. 1. The node includes at least two input ports 132a-b on input chip 132 and at least two output ports on each of the two output chips. Additional input chips and input ports may be included. Four output ports are shown. A first set of output ports 140a-b is provided by a first chip 142a, and a second set of output ports 141a-b is provided by a second chip 142b. The first chip 142a includes at least two output queues 150a-b, and the second chip 142b includes at least two output queues 151a-b. All of the input ports are connected to all of the output ports through a crossbar 134. Additional, fewer, or different components may be included in the node of FIG. 4.

A scheduler 138, which may be configured to provide the functions of the arbiter 128 described above, is in communication with the crossbar 134 and each of the output chips 142a-b and the input chips 132a-b. The example node of FIG. 1 is meant as a functional diagram, a single logical structure such as a controller may execute the functions performed by the scheduler 138 as well as the input chip 132 and output chips 142a-b. For example, each of the input ports 132a-b maintains a set of virtual output queues that corresponds to each of the output ports. For example, input chip 132a includes four virtual output queues 130a-d respectively associated with output ports 140a-b and output ports 141a-b, and input chip 132b includes four virtual output queues 131a-d associated with output ports 140a-b and output ports 141a-b.

On the scale shown in FIG. 4, latency may not pose a significant threat. However, when the node includes many ports, delays reach unacceptable levels. The node may include hundreds or thousands of input ports connected to each output. If a switch fabric includes 100 line cards each with 100 megabytes of buffer memory, the maximum possible backlog may be 10 gigabytes, which requires a significant amount of time to drain, even by extremely fast links.

The node is configured to control the draining rate of each of the virtual output queues and configured to control the maximum size of each of the virtual output queues. Through one or both of these controls packet flows from the plurality of input ports to the output port so that each of the input ports has the same or similar latency. For example, a difference between a first latency of a first packet received at a first input port of the plurality of input ports and a second latency of a second packet received at a second input port of the plurality of input ports is within a predetermined range. Examples for the predetermined range could be any amount of time including 1 millisecond, 10 milliseconds, and 100 milliseconds.

The maximum size of each of the virtual output queues is dependent on the other virtual output queues associated with the same output port. That is, because virtual output queue 130a and virtual output queue 131a are both associated with output port 140a, the maximum size for virtual output queue 130a depends on the current occupancy of virtual output queue 130a and virtual output queue 131a. Likewise, the maximum size for virtual output queue 131a depends on the current occupancy of virtual output queue 130a and virtual output queue 131a. The maximum size may very over time.

For example, the scheduler 138 or other logical controller is configured to calculate an aggregate queue length value for output port 140 a as a sum of virtual output queue length values for virtual output queue 130a and virtual output queue 131a. The scheduler 138 or other logical controller is configured to calculate a difference between the aggregate queue length value and a predetermined queue length value. The predetermined queue length value is an amount of data considered a tipping point for causing congestion at the output port. In one example, the predetermined queue length value may be from 150 to 300 kilobytes.

The scheduler 138 or other logical controller generates a feedback message based on the difference between the aggregate queue length value and the predetermined queue length value. The difference may be compared to one or more thresholds. For example, a lower threshold may indicate that a warning should be issued regarding congestion associated with the output port 140. The congestion warning may be sent upstream to another node that is configured to adjust the data flow rate for packets destined for input port 132a and/or input port 132b.

A higher threshold may indicate that a packet drop command should be sent to one or both of virtual output queue 130a and virtual output queue 131a. The packet drop command causes the virtual output queues to drop packets. Through sequence gaps in the flow of packets or other messaging, dropped packets trigger remedial measures such as retransmission of the packets.

In addition, the node is configured to control the draining rate of each of the virtual output queues. The draining rates of the virtual output queues may be controlled individually according to the occupancy of each of the virtual output queues. The scheduler 138 or other logical controller is configured to monitor the occupancy of the virtual queues 130a-d and 131a-d in the input ports 132a-b. The occupancy is the size of the data buffered in the queues. A draining rate on a per queue basis or per port basis is set for the virtual queues 130a-d and 131a-d according to a corresponding occupancy of each of the output ports. When the draining rate is set on a per queue basis, the drain rate of each queue is set independently.

As the occupancy of the virtual queue decreases (e.g., approaches zero occupancy), the draining rate of the virtual queue is set at lower and lower values. A very low draining rate interrupts the operation of the switch. Therefore, in one embodiment the drain rate is not direction proportional to the occupancy value. Instead, a lower limit is introduced on the drain rate. In another embodiment, a decaying average, a time average, or other time based function is applied to the draining rate. The time average or window based average uses the average occupancy over a time range in calculating the draining rate. The decaying average means that for each unit of time, a portion of the old value of the queue length is removed. The current occupancy value that is used is a function of the current occupancy and one or more past occupancies. The current occupancy value may be a weighted average of the current occupancy and one or more past occupancies. An example decaying average is shown by Equation 2, where time iterations are represented by n and weights W add up to 1 (e.g., $W_2=W_1-1$). Example values for $(W_1, W_2)$ include (0.5, 0.5), (0.75, 0.25), and (0.9, 0.1).

$$\text{Avg\_Occupancy}[n] = W_1 * \text{Occupancy}[n] + W_2 * \text{Avg\_Occupancy}[n-1] \qquad \text{Eq. 2}$$

Alternatively, the maximum size of the virtual output queues may be controlled by setting them to a predetermined value irrespective of the current occupancies. For example, if the drain rates are constant, latency is approximately the same across the input ports. The scheduler 138 or other logical controller is configured to access a current queue length value for each of the input ports and determine a draining rate for each of the input ports according to the current queue length value.

In one embodiment the node is configured for both possibilities. For example, if the scheduling is round robin, packets are buffered in such a way that the queue length is proportional to the draining rate. If the scheduling is weighted round robin, the virtual output queues are drained at a rate proportional to the virtual output queues length. Round robin scheduling means that packets are divided in time succession evenly among ports. Weighted round robin scheduling means that packets are divided in time succession disproportionally among ports.

Figure 5:
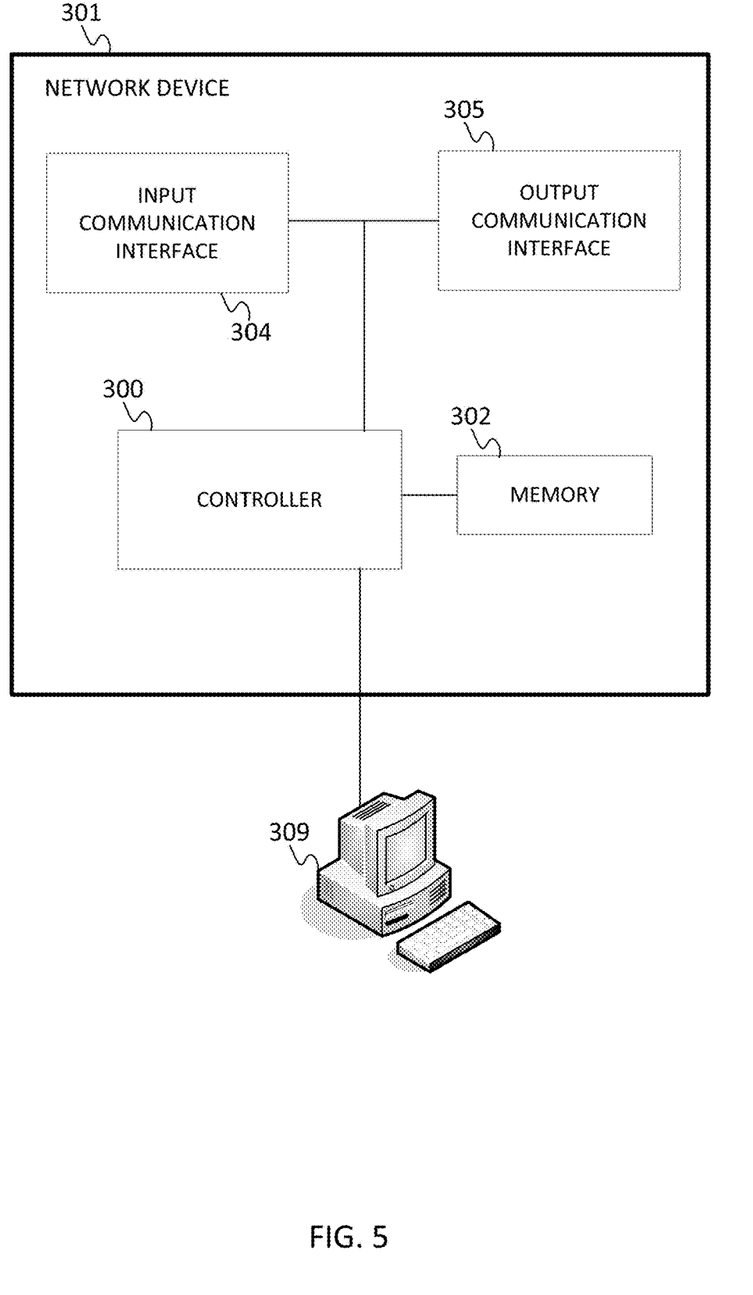
FIG. 5 illustrates another example embodiment of a node of FIG. 1.

FIG. 5 Illustrates an example network device 301 configured for packet switching. The network device 301 may be an input queue switch. The network device 301 may include one or more integrated circuits programmed or designed to replicate and forward data packets. For example, the network device 301 may include an application specific integrated circuit (ASIC). Other devices than ASIC may be used, such as field programmable gate arrays or general processors. The network device 301 includes at least a controller 300, a memory 302, an input communication interface 304, and an output communication interface 305. The network device 301 may also communicate with a workstation 309. Additional, fewer, or different components may be included in the network device of FIG. 5.

The input communication interface 304 may include one or more ingress ports. The input communication interface 304 is configured to receive a sequence of data packets from an upstream node. The sequence of data packets may be encoded for multicast and include a multicast group label or a destination address associated with multiple output ports. The output communication interface 305 may include the multiple output ports. The output communication interface 305 is configured to receive a virtual output queue length value from each of a set of input ports coupled to the output port.

The controller 300 includes logical circuitry or hardware for input queue switching. The controller 300 is configured to calculate an aggregate queue length value for the output port as a sum of the corresponding virtual output queue length value from each of the set of input ports. The controller 300 compares the aggregate queue length value to a predetermined threshold and provides feedback to the input ports according to the comparison. The feedback may define the size and/or draining rate of the virtual output queues.

In one example, the feedback includes a tail drop message if the aggregate queue value exceeds the predetermined threshold. The tail drop message instructs at least one of the input ports to stop buffering subsequent packets associated with the output port. Packets that are not buffered may be dropped. An indication of dropped packets may instruct TCP to slow the rate of data sent to the input port. Alternatively or in addition, the indication of dropped packets may instruct an upstream server or endpoint to select an alternate route for the dropped packets.

The controller 300 may include a general processor, digital signal processor, an application specific integrated circuit (ASIC), field programmable gate array (FPGA), analog circuit, digital circuit, combinations thereof, or other now known or later developed processor. The controller 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device 101, such as a secure digital (SD) memory card.

In addition to ingress ports and egress ports, the input communication interface 304 and the output communication interface 305 may include any operable connection. An operable connection may be one in which signals, physical communications, and/or logical communications may be sent and/or received. An operable connection may include a physical interface, an electrical interface, and/or a data interface.

Figure 6:
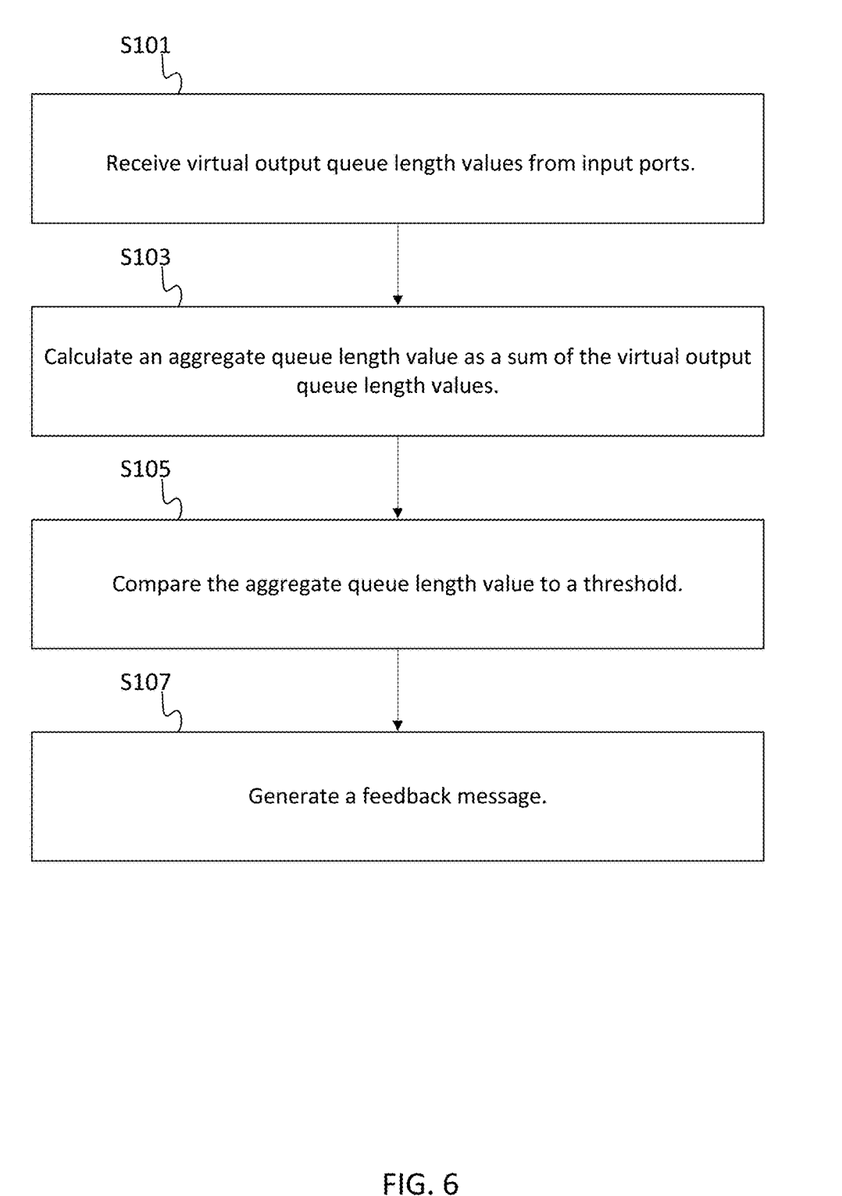
FIG. 6 illustrates an example flowchart for one embodiment of latency fairness in input queue buffering.

FIG. 6 illustrates an example flowchart for one embodiment input queue switching. A node of a fabric receives a packet. The fabric is a network topology in which network nodes connect with each other via network switches or crossbar switches. The fabric may be in a single device having multiple nodes within or a network of devices, each functioning as a node.

At act S101, the node receives virtual queue length values from input ports. The virtual queue length values may be received from memory. The virtual queue length values may be logically received at the output port logic from the input port logic. The virtual queue length values describe how much data each input port has queued for a specific output port.

At act S103, the node calculates an aggregate queue length value by summing the virtual output queue length values. Act S103 may be repeated for each output port. The aggregate queue length value represents how much queued data across all of the input ports is destined for a particular output port.

At act S105, the node compares the aggregate queue length value to a predetermined threshold. The predetermined threshold may be accessed from memory or received from a user input at workstation 309. The predetermined threshold may be variable based on the performance of the node. The comparison may occur at the input ports or the output ports.

At act S107, the node generates a feedback message. When the comparison occurs at the output ports, the feedback message may be a tail drop message generated in response to the aggregate queue value exceeding the threshold. When the comparison occurs at the input ports, the feedback message may include the aggregate queue value. Thus, acts S107 and S105 may occur in time in either order. At act S109, the node forwards the tail drop message to instruct the inputs ports to stop buffering subsequent packets. The packets that are not buffered may be dropped. However, dropped packed may be detected in TCP based on the sequence numbers in the data flow. Accordingly, upstream servers or endpoints may transmit the packets again.

In an alternative embodiment, the node maintains latency fairness in an input queue switch by scheduling transmission of the packets to the output based on the arrival time of the packets. With reference back to FIG. 4, an optional timer 133 is coupled to the input of the virtual output queues to apply a time stamp on each incoming packet upon arrival at each virtual output queue. When deciding the next packet for any egress port, the scheduler 138 selects the virtual output queue with the oldest timestamp to dequeue. The output port associated with these virtual output queues may generate a message that instructs the inputs to dequeue packets older than a certain timestamp value. In one implementation of this alternative embodiment, the clocks of the various inputs are synchronized, and the oldest timestamp is selected.

In one implementation of this alternative embodiment, each input port receives the respective timestamp value from a counter (e.g., a wall clock). In one embodiment, the wall clocks of all input ports are incremented based on a common system clock. In another embodiment, the wall clock of each input port is incremented by separate independent clocks and a specialized protocol is used to synchronize the value of the different wall clocks. Such a protocol may elect one wall clock as the master and all other input ports exchange messages with the master to synchronize respective wall clocks to the master.

In one embodiment, all input ports send the timestamp value of the packet at the head of each virtual output queues to the corresponding output port. The output port sends a message back to the input port with the oldest timestamp value to send a packet.

At the inputs, the network device receives a flow of incoming packets. The flow of incoming packets may include a sequence of data packets. The data packets include control information (e.g., a header) and a payload. The header may include a destination group label, a source address, a packet identification value, a sequence value, and/or a checksum or other error correcting code. The network device is configured to replicate the flow of incoming packets for multiple output ports.

Multicast may be implemented by replicating a received packet for distribution to a set of output ports by way of a set of output queues. A multicast packet includes a label for the multicast group that defines the destinations of the multicast packet. A bitmap (e.g., a fabric port of exit (FPOE) bitmap) may define which of the set of output queues the multicast packet is to be forwarded to in order to reach the destinations.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
receiving a virtual output queue length value from each virtual output queue at each of a plurality of input ports coupled to an output port, wherein the output port includes an output queue having a size less than a size of each virtual output queue such that packet flow control is not performed at the output queue;
calculating, by a controller, an aggregate queue length value for the output port as a sum of each virtual output queue length value from each of the plurality of input ports, the aggregate queue length value representing an amount of data across the plurality of input ports and destined for the output port;
generating a feedback drop instruction for at least one of the plurality of input ports based on the aggregate queue length value for the output port;
instructing, in response to the feedback drop instruction, the at least one of the plurality of input ports to drop packets based on the aggregate queue length value wherein packets are dropped rather than delayed.

2. The method of claim 1, wherein a difference between a first latency of a first packet received at a first input port of the plurality of input ports and a second latency of a second packet received at a second input port of the plurality of input ports is within a predetermined range.

3. The method of claim 1, wherein the output port is an egress port of an input queue switch.

4. A network device comprising:
a communication interface of an output port, the communication interface configured to receive a virtual output queue length value from each virtual output queue at each of a plurality of input ports coupled to the output port, wherein the output port includes an output queue having a size less than a size of each virtual output queue such that packet flow control is not performed at the output queue; and
a controller configured to calculate an aggregate queue length value for the output port as a sum of each virtual output queue length value from each of the plurality of input ports and compare the aggregate queue length value to a predetermined threshold, the aggregate queue length value representing an amount of data of all of the plurality of input ports and destined for the output port; wherein feedback is provided to the plurality of input ports according to a result of the comparison,
wherein the controller is configured to generate a tail drop message if the aggregate queue length value exceeds the predetermined threshold, wherein the tail drop message instructs the plurality of input ports to stop buffering subsequent packets associated with the output port and start dropping subsequent packets associated with the output port.

5. The network device of claim 4, wherein the controller is configured to monitor an occupancy of each virtual output queue at each of the plurality of input ports and set a draining rate for each virtual output queue at each of the plurality of input ports according to the occupancy of the corresponding virtual output queue,
wherein the draining rate is set according to a decaying average function based on the occupancy and at least one past occupancy for the corresponding virtual output queue.

6. The network device of claim 4, wherein the controller is configured to determine a draining rate for each of the plurality of input ports according to a current queue length value for each of the plurality of input ports.

7. The network device of claim 4, wherein a difference between a first latency of a first packet received at a first input port of the plurality of input ports and a second latency of a second packet received at a second input port of the plurality of input ports is within a predetermined range.

8. The network device of claim 4, wherein the network device is an input queue switch without output queuing in excess of a threshold amount.

9. The network device of claim 4, wherein the plurality of input ports is arranged on a first chip and the output port is arranged on a second chip.

10. A non-transitory computer readable medium containing instructions that when executed by a computer processor cause the computer processor to:
calculate an aggregate queue length value for an output port as a sum of a plurality of virtual output queue length values, wherein each of the virtual output queue length values is associated with one of a plurality of input ports, wherein the output port includes an output queue having a size less than a size of each virtual output queue at each of the plurality of input ports such that packet flow control is not performed at the output queue;
calculate a difference between the aggregate queue length value and a predetermined queue length value; and
generate a message based on the difference between the aggregate queue length value and the predetermined queue length value,
wherein when the difference between the aggregate queue length value and the predetermined queue length value exceeds a first threshold, the message includes a congestion warning, and
wherein when the difference between the aggregate queue length value and the predetermined queue length value exceeds a second threshold, the message includes a packet drop command,
wherein the second threshold is greater than the first threshold,
wherein the second threshold is triggered after the first threshold.

11. A method comprising:
receiving a virtual output queue length value from each virtual output queue at each of a plurality of input ports coupled to an output port, wherein the output port includes an output queue having a size less than a size of each virtual output queue such that packet flow control is not performed at the output queue;
calculating, by a controller, an aggregate queue length value for the output port as a sum of each virtual output queue length value from each of the plurality of input ports, the aggregate queue length value representing an amount of data across the plurality of input ports and destined for the output port;
generating a feedback message for at least one of the plurality of input ports including the aggregate queue length value; and
comparing, by the controller, the aggregate queue length value to a first threshold and a second threshold, wherein the second threshold is greater than the first threshold,
wherein the feedback message instructs the at least one of the plurality of input ports to stop buffering subsequent packets associated with the output port when the aggregate queue length value exceeds the second threshold, and
wherein the feedback message includes a congestion warning when the aggregate queue length value is between the first threshold and the second threshold.

12. The network device of claim 4, wherein the controller is configured to set the draining rate for each of the plurality of input ports according to a latency parameter.

13. The non-transitory computer readable medium of claim 10, wherein the instructions further cause the computer processor to:
monitor an occupancy of a first virtual output queue at one of the plurality of input ports; and
set a draining rate for the first virtual output queue based on the occupancy of the first virtual output queue and based on a latency parameter.

14. The method of claim 11, further comprising:
monitoring an occupancy of a first virtual output queue at the at least one of the plurality of input ports; and
setting a draining rate for the first virtual output queue based on the occupancy of the first virtual output queue and based on a latency parameter.

15. The non-transitory computer readable medium of claim 10, wherein a first network device comprises the output port and the plurality of input ports and the message including the congestion warning is for a second network device.

16. The method of claim 11, wherein a first network device comprises the output port and the plurality of input ports and the message including the congestion warning is for a second network device.

17. A non-transitory computer readable medium containing instructions that when executed by a computer processor cause the computer processor to:
receive a virtual output queue length value from each virtual output queue at each of a plurality of input ports coupled to an output port, wherein the output port includes an output queue having a size less than a size of each virtual output queue such that packet flow control is not performed at the output queue;
calculate an aggregate queue length value for the output port as a sum of each virtual output queue length value from each of the plurality of input ports, the aggregate queue length value representing an amount of data across the plurality of input ports and destined for the output port;
generate a feedback drop instruction for at least one of the plurality of input ports based on the aggregate queue length value for the output port;
instruct, in response to the feedback drop instruction, the at least one of the plurality of input ports to drop packets based on the aggregate queue length value wherein packets are dropped rather than delayed.

18. The method of claim 1, further comprising:
monitoring an occupancy of each virtual output queue at each of the plurality of input ports; and
setting a draining rate for each virtual output queue at each of the plurality of input ports according to the occupancy of the corresponding virtual output queue.

19. The method of claim 18, wherein the draining rate is set according to a decaying average function based on the occupancy and at least one past occupancy for the corresponding virtual output queue.

20. The non-transitory computer readable medium of claim 17, wherein the instructions further cause the computer processor to:
monitor an occupancy of each virtual output queue at each of the plurality of input ports; and
set a draining rate for each virtual output queue at each of the plurality of input ports according to the occupancy of the corresponding virtual output queue.

* * * * *